US012572094B2

(12) United States Patent
Endo

(10) Patent No.: US 12,572,094 B2
(45) Date of Patent: Mar. 10, 2026

(54) FIXING DEVICE AND IMAGE PROCESSING DEVICE

(71) Applicant: Toshiba Tec Kabushiki Kaisha, Tokyo (JP)

(72) Inventor: Sasuke Endo, Chigasaki (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/582,828

(22) Filed: Feb. 21, 2024

(65) Prior Publication Data

US 2024/0411248 A1 Dec. 12, 2024

(30) Foreign Application Priority Data

Jun. 9, 2023 (JP) ................................ 2023-095583

(51) Int. Cl.
*G03G 15/20* (2006.01)
*G03G 15/00* (2006.01)

(52) U.S. Cl.
CPC ..... *G03G 15/2017* (2013.01); *G03G 15/2053* (2013.01); *G03G 15/2064* (2013.01); *G03G 15/50* (2013.01)

(58) Field of Classification Search
CPC ........... G03G 15/2053; G03G 15/2039; G03G 15/2064; G03G 15/2032
See application file for complete search history.

(56) References Cited

U.S. PATENT DOCUMENTS

| | | | | |
|---|---|---|---|---|
| 10,852,678 | B1 * | 12/2020 | Inomata | G03G 15/2064 |
| 2006/0153605 | A1 | 7/2006 | Nishiyama et al. | |
| 2008/0304847 | A1 | 12/2008 | Hirano | |
| 2020/0257223 | A1 | 8/2020 | Kikuchi | |
| 2022/0043377 | A1 * | 2/2022 | Endo | G03G 15/2042 |

FOREIGN PATENT DOCUMENTS

| | | |
|---|---|---|
| JP | 2005-114959 A | 4/2005 |
| JP | 2006-154005 A | 6/2006 |
| JP | A-2008-304866 | 12/2008 |
| JP | 2010-107914 A | 5/2010 |
| JP | A-2012-242650 | 12/2012 |
| JP | A-2013-164451 | 8/2013 |
| JP | 2022-029694 A | 2/2022 |
| JP | 2023-018604 A | 2/2023 |

OTHER PUBLICATIONS

Japanese Office Action for JP Appl. Ser. No. 2023-095583 dated Jan. 27, 2026 (7 pages).

* cited by examiner

*Primary Examiner* — Jessica L Eley
(74) *Attorney, Agent, or Firm* — Foley & Lardner LLP

(57) ABSTRACT

According to one embodiment, a fixing device includes a cylindrical member, a heater, a holder, a sensor, a roller, and a pressing mechanism. The pressing mechanism is configured to change a pressure between the cylindrical member and the roller.

15 Claims, 9 Drawing Sheets

FIXING DEVICE AND IMAGE PROCESSING DEVICE

CROSS-REFERENCE TO RELATED APPLICATION

This application claims priority from Japanese Patent Application No. 2023-095583 filed on Jun. 9, 2023, the contents of which are incorporated herein by reference in their entirety.

FIELD

Embodiments of the present invention relate to a fixing device and an image processing device.

BACKGROUND

An image forming device that forms an image on a sheet is used as an image processing device. The image forming device includes a fixing device that fixes toner to a sheet. Improvement in durability is needed for the fixing device.

DETAILED DESCRIPTION

According to one embodiment, a fixing device includes a cylindrical member, a heater, a holder, a sensor, a roller, and a pressing mechanism. The cylindrical member is formed in a sheet shape. The heater is provided inside the cylindrical member. The heater has a longitudinal direction along an axial direction of the cylindrical member. The heater has a heating region. The heating region is configured to radiate heat when a current is supplied thereto. The holder holds the heater. The sensor is in contact with the heater. The sensor is configured to detect a temperature of the heater. The roller is in contact with an outer peripheral face of the cylindrical member. The roller forms a nip between the roller and the cylindrical member. The pressing mechanism is configured to change a pressure between the cylindrical member and the roller.

Hereinafter, a fixing device according to an embodiment will be described with reference to the accompanying drawings. In the following description, elements having the same or similar functions will be referred to by the same reference signs, and repeated description thereof may be omitted.

Figure 1:
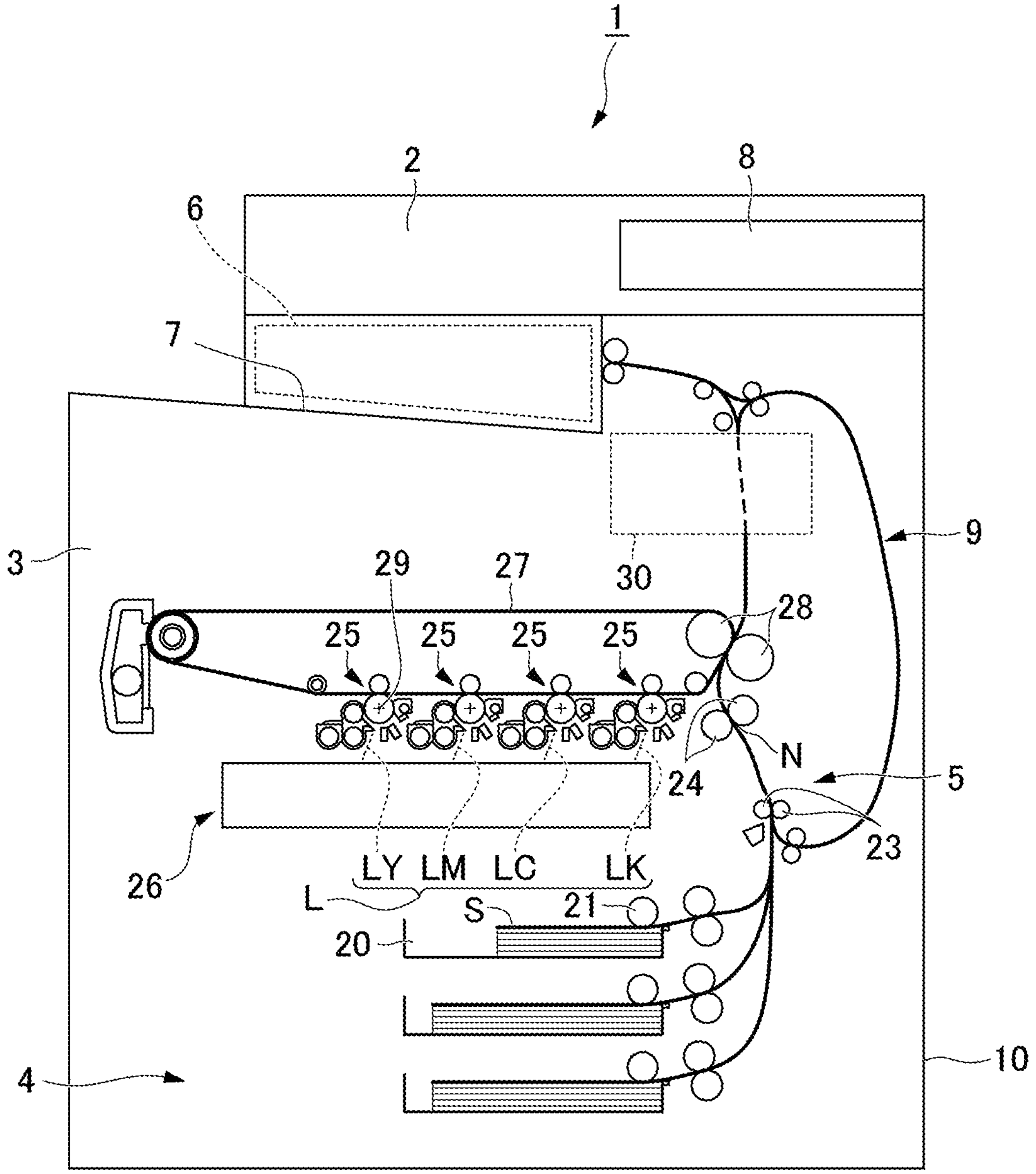
FIG. 1 is a diagram schematically showing a configuration of an image processing device according to an embodiment.

FIG. 1 is a diagram schematically showing a configuration of an image processing device according to an embodiment.

The image processing device according to the embodiment is, for example, an image forming device 1 of a multi-function peripheral (MFP) printer or a copy machine. For example, the image forming device 1 is installed in a work place. The image forming device 1 performs a process of forming an image on a sheet S. The sheet S may be a sheet of paper. The image forming device 1 includes a housing 10, a scanner 2, an image forming unit 3, a sheet feeder 4, a carrier unit 5, a sheet discharge tray 7, a turn-over unit 9, a control panel 8, and a controller 6.

The housing 10 forms an outer shape of the image forming device 1.

The scanner 2 reads image information of a copying object as brightness of light and generates an image signal. The scanner 2 outputs the generated image signal to the image forming unit 3.

The image forming unit 3 forms a toner image using a recording agent such as a toner based on the image signal received from the scanner 2 or an image signal received from the outside. The image forming unit 3 transfers the toner image to the surface of the sheet S. The image forming unit 3 fixes the toner image onto the sheet S by heating and pressurizing the toner image on the surface of the sheet S. Details of the image forming unit 3 will be described later.

The sheet feeder 4 feeds sheets S to the carrier unit 5 one by one according to the timing at which the image forming unit 3 forms a toner image. The sheet feeder 4 includes a sheet accommodation unit 20 and a pickup roller 21.

The sheet accommodation unit 20 accommodates sheets S of a predetermined size and type.

The pickup roller 21 picks up the sheets S one by one from the sheet accommodation unit 20. The pickup roller 21 feeds the picked sheet S to the carrier unit 5.

The carrier unit 5 carries the sheet S fed from the sheet feeder 4 to the image forming unit 3. The carrier unit 5 includes a carrier roller 23 and a resistance roller 24.

The carrier roller 23 carries the sheet S fed from the pickup roller 21 to the resistance roller 24. The carrier roller 23 brings a tip in a carrying direction of the sheet S into contact with a nip N of the resistance roller 24.

The resistance roller 24 aligns the position of the tip of the sheet S in the carrying direction by bending the sheet S in the nip N. The resistance roller 24 carries the sheet S according to the timing at which the image forming unit 3 transfers a toner image onto the sheet S.

The image forming unit 3 will be described below.

The image forming unit 3 includes a plurality of image forming parts 25, a laser scanning unit 26, an intermediate transfer belt 27, a transfer unit 28, and a fixing device 30.

Each image forming part 25 includes a photosensitive drum 29. Each image forming part 25 forms a toner image corresponding to the image signal from the scanner 2 or the outside on the photosensitive drum 29. The plurality of image forming parts 25 form toner images using toners of yellow, magenta, cyan, and black.

A charging unit, a developing unit, or the like are arranged near each photosensitive drum 29. The charging unit charges the surface of the photosensitive drum 29. The developing unit accommodates a developer including the toners of yellow, magenta, cyan, and black. The developing unit develops an electrostatic latent image on the photosensitive drum 29. As a result, toner images based on the color toners are formed on the photosensitive drums 29.

The laser scanning unit 26 exposes the photosensitive drums 29 by scanning the charged photosensitive drums 29 with a laser beam L. The laser scanning unit 26 includes a plurality of light sources corresponding to laser beams LY, LM, LC, and LK. The laser scanning unit 26 exposes the photosensitive drums 29 of yellow, magenta, cyan, and black in the image forming parts 25 to the laser beams LY, LM, LC, and LK, respectively. Accordingly, the laser scanning unit 26 forms electrostatic latent images on the photosensitive drums 29.

The toner images on the surfaces of the photosensitive drums 29 are primarily transferred to the intermediate transfer belt 27.

The transfer unit 28 transfers the toner images primarily transferred onto the intermediate transfer belt 27 to the surface of the sheet S at a secondary transfer position.

The fixing device 30 fixes the toner images on the sheet S by heating and pressurizing the toner images transferred to the sheet S. Details of the fixing device 30 will be described later.

The turn-over unit 9 turns over the sheet S to form an image on the rear surface of the sheet S. The turn-over unit 9 turns over the surface and the rear surface of the sheet S discharged from the fixing device 30 in a switch-back manner. The turn-over unit 9 carries the turned-over sheet S to the resistance roller 24.

The sheet S on which an image has been formed and which has been discharged is placed on the sheet discharge tray 7.

The control panel 8 is a part of an input unit for allowing an operator to input information for operating the image forming device 1. The control panel 8 includes a touch panel or various hardware keys.

The controller 6 controls the constituents of the image forming device 1.

Figure 2:
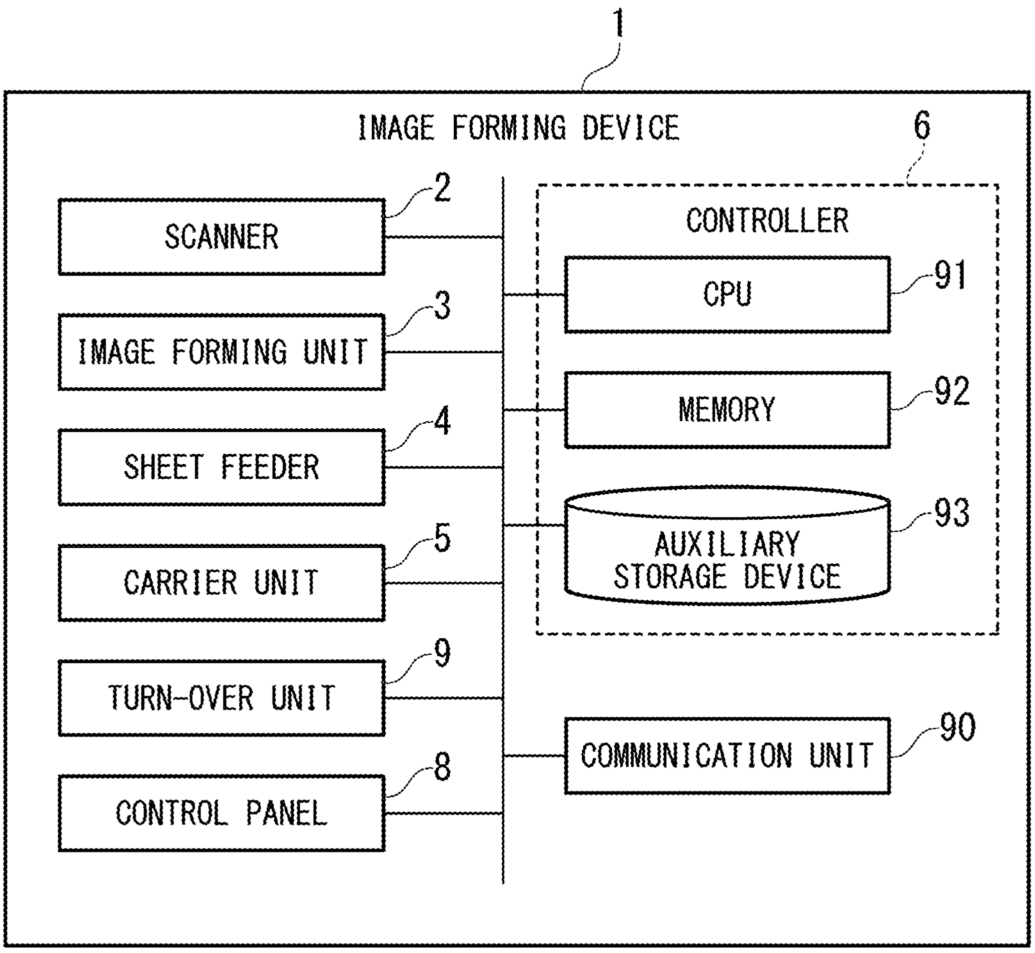
FIG. 2 is a diagram showing a hardware configuration of an image forming device according to the embodiment.

FIG. 2 is a diagram showing a hardware configuration of the image forming device according to the embodiment.

As shown in FIG. 2, the image forming device 1 includes a central processing unit (CPU) 91, a memory 92, and an auxiliary storage device 93 which are connected to each other via a bus and executes a program. The image forming device 1 serves as a device including the scanner 2, the image forming unit 3, the sheet feeder 4, the carrier unit 5, the turn-over unit 9, the control panel 8, and a communication unit 90 by executing the program.

The CPU 91 serves as the controller 6 by executing a program stored in the memory 92 and the auxiliary storage device 93. The controller 6 controls operations of the functional constituents of the image forming device 1. The functional configuration of the controller 6 will be described later.

The auxiliary storage device 93 is constituted by a storage device such as a magnetic hard disk device or a semiconductor storage device. The auxiliary storage device 93 stores information.

The communication unit 90 includes a communication interface for connection to an external device. The communication unit 90 communicates with the external device via the communication interface.

First Embodiment

A fixing device 30 according to a first embodiment will be described below.

Figure 3:
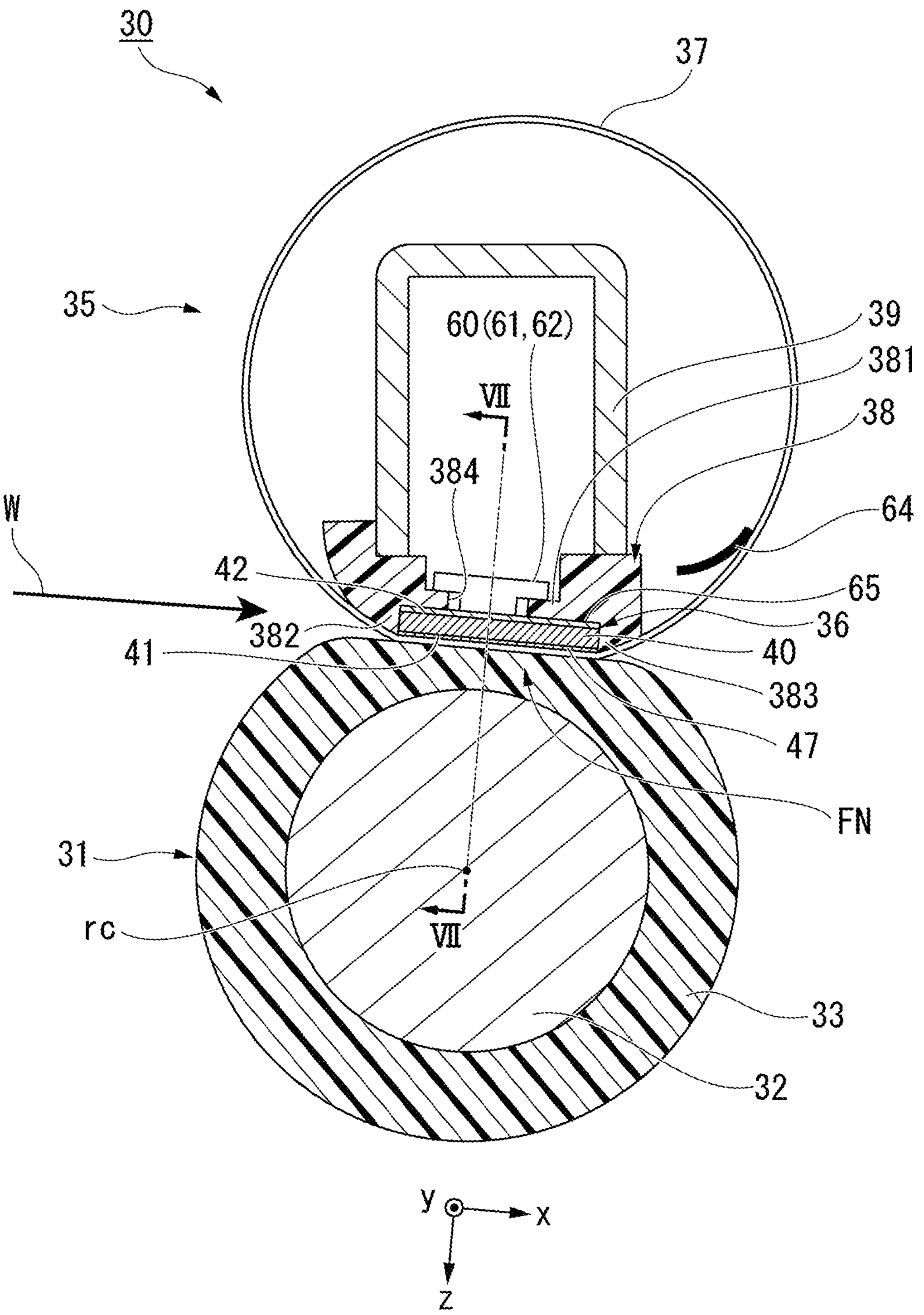
FIG. 3 is a front cross-sectional view showing a fixing device according to a first embodiment.

FIG. 3 is a front cross-sectional view showing the fixing device according to the first embodiment.

As shown in FIG. 3, the fixing device 30 includes a roller 31, a film unit 35, a pressing mechanism 70, a movement mechanism 80, and a frame 34. A fixing nip FN is formed between the roller 31 and the film unit 35. The roller 31 pressurizes a toner image on a sheet S entering the fixing nip FN. The roller 31 rotates to carry the sheet S. The film unit 35 heats the toner image on the sheet S entering the fixing nip FN. The frame 34 is fixed to a housing 10 of the image forming device 1. The frame 34 supports the roller 31, the film unit 35, and the movement mechanism 80.

In this specification, a z direction, an x direction, and a y direction are defined as follows. The z direction is a direction in which the roller 31 and the film unit 35 are arranged. The +z direction is a direction from the film unit 35 to the roller 31. The −z direction is a direction opposite to the +z direction. The x direction is a direction in which a sheet S is carried in the fixing nip FN. The +x direction is a direction downstream in the carrying direction of the sheet S. The −x direction is a direction opposite to the +x direction. The y direction is a direction perpendicular to the z direction and the x direction. The y direction is an axial direction of the roller 31. A direction from one end to the other end of the roller 31 is the +y direction. The −y direction is opposite to the +y direction.

The roller 31 is rotatable around a pressing-roller rotation center rc. The roller 31 includes a core bar 32, an elastic layer 33, and a release layer. The roller 31 may be referred to as a pressing roller.

The core bar 32 is formed in a cylindrical shape out of a metallic material such as stainless steel. Both ends in an axial direction of the core bar 32 are rotatably supported. The core bar 32 is rotationally driven by a motor. The core bar 32 comes into contact with a cam member. The cam member causes the core bar 32 to approach or be separated from the film unit 35 by rotating.

The elastic layer 33 is formed of an elastic material such as silicone rubber. The elastic layer 33 is formed in a constant thickness on an outer circumferential surface of the core bar 32.

The release layer is formed of a resin material such as a tetrafluoroethylene-perfluoroalkyl vinyl ether copolymer (PFA). The release layer is formed on an outer circumferential surface of the elastic layer 33.

It is preferable that hardness of the outer circumferential surface of the roller 31 range from 40□ to 70□ at a load of 9.8 N with an ASKER-C durometer. Accordingly, the area of the fixing nip FN and the durability of the roller 31 are secured.

The roller 31 is rotationally driven to rotate by a motor. When the roller 31 rotates in a state in which the fixing nip FN is formed, a cylindrical member 37 of the film unit 35 rotates to follow the rotation. The roller 31 carries the sheet S in the carrying direction W by rotating in a state in which the sheet S is disposed in the fixing nip FN.

The film unit 35 includes a cylindrical member 37, a heater 36, a holder 38, a stay 39, a thermo-sensitive element 60, and a film thermometer 64.

The cylindrical member 37 is a fixing belt. The cylindrical member 37 is a cylindrical film extending in the y direction. The cylindrical member 37 includes a base layer, an elastic layer 33, and a release layer sequentially from the inner circumference to the outer circumference of the cylindrical member 37. The base layer is formed in a cylindrical shape out of a material such as polyimide. The elastic layer 33 is stacked on the outer circumferential surface of the base layer. The elastic layer 33 is formed of an elastic material such as silicone rubber. The release layer is stacked on the outer circumferential surface of the elastic layer 33. The release layer is formed of a material such as a PFA resin.

The heater 36 is located inside of the cylindrical member 37. The heater 36 includes a heater unit 40 and a heat-transfer member 65. The heater 36 may be referred to as a heating-slide member.

The heater unit 40 is formed in a rectangular plate shape. A longitudinal direction in which a long side (a first side) of the heater unit 40 extends is the y direction, and a short direction in which a short side (a second side) of the heater unit 40 extends is the x direction. In the x direction and the y direction, a direction approaching the center of the heater unit 40 may be referred to as inside, inward, or an inward direction, and a direction away from the center of the heater unit 40 may be referred to as outside, outward, or an outward direction. The heater unit 40 includes a first surface 41 facing the +z direction and a second surface 42 opposite to the first surface 41. The first surface 41 of the heater unit 40 heats the cylindrical member 37. The first surface 41 comes into contact with the inner surface of the cylindrical member 37 with a grease 47 interposed therebetween.

Figure 4:
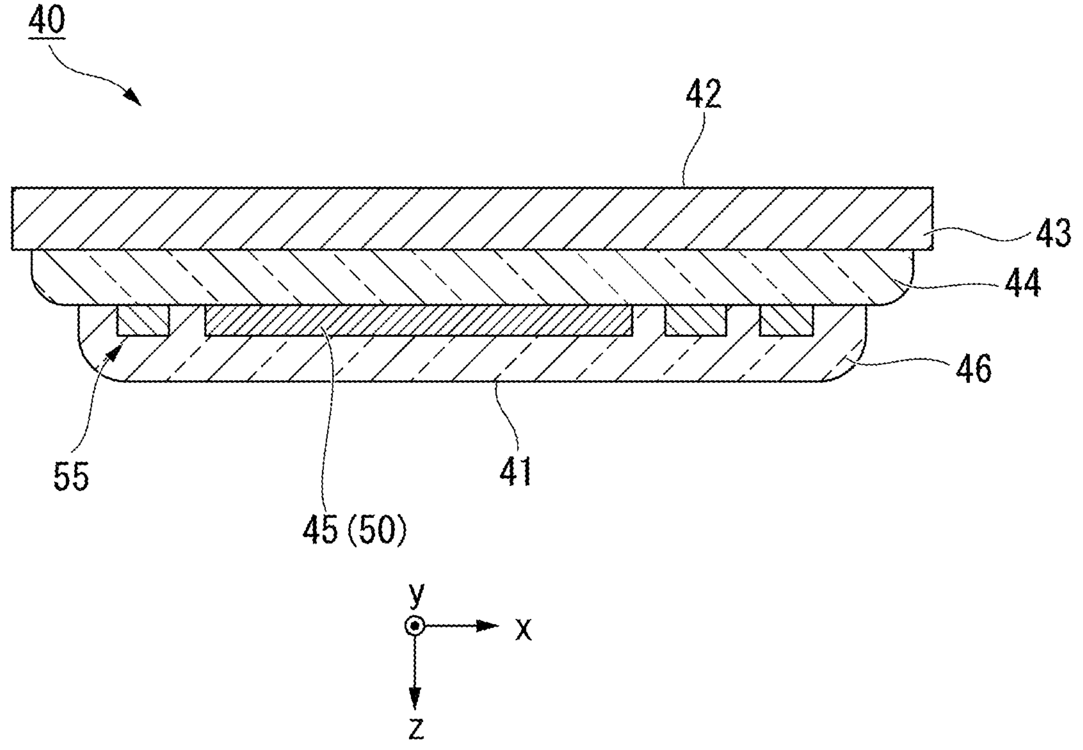
FIG. 4 is a front cross-sectional view showing a heater unit taken along line IV-IV shown in FIG. 5.
Figure 5:
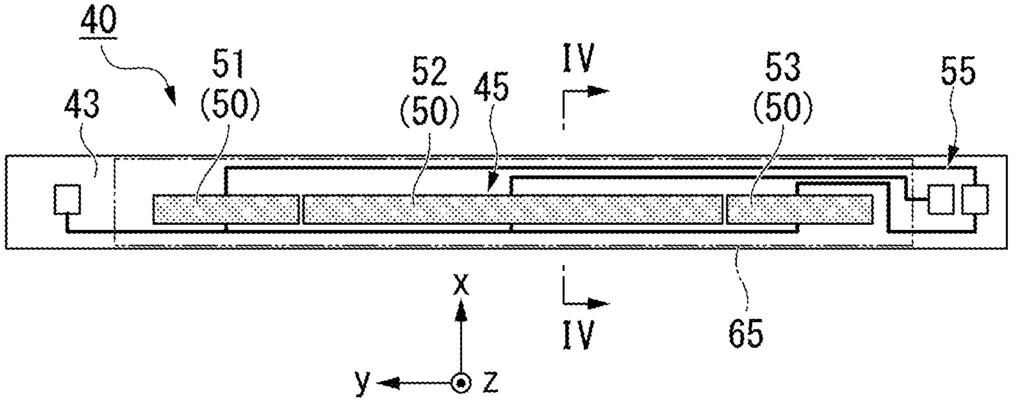
FIG. 5 is a bottom view showing the heater unit according to the first embodiment.

FIG. 4 is a front cross-sectional view showing the heater unit taken along line IV-IV shown in FIG. 5. FIG. 5 is a bottom view (a view in the +z direction) of the heater unit according to the first embodiment.

As shown in FIGS. 4 and 5, the heater unit 40 includes a substrate 43, a heating region 45, and a wiring set 55.

The substrate 43 is formed of a metallic material such as stainless steel, a ceramic material such as aluminum nitride, or the like. The substrate 43 is formed in a rectangular plate shape. A longitudinal direction in which a long side (a first side) of the substrate 43 extends is the y direction, and a short direction in which a short side (a second side) of the substrate 43 extends is the x direction. An insulating layer 44 is formed on the +z-direction surface of the substrate 43 out of a glass material or the like. The −z-direction surface of the substrate 43 is a second surface 42 of the heater unit 40. The second surface 42 of the heater unit 40 is formed on a plane perpendicular to the z direction.

As shown in FIG. 5, the heating region 45 is provided in the substrate 43. The heating region 45 includes at least one heating member 50. The heating member 50 is formed by arranging a material such as a silver-palladium alloy on the substrate 43 through screen print. The heating region 45 is defined as a region between two heating members 50 located at both ends in the y direction and between two heating members 50 located at both ends in the x direction out of all the heating members 50. The whole outer shape of the heating region 45 is rectangular. A longitudinal direction in which a long side (a first side) of the heating region 45 extends is the y direction, and a short direction in which a short side (a second side) of the heating region 45 extends is the x direction. The heating region 45 is located inside of both ends of the substrate 43 in the y direction and is located inside of both ends of the substrate 43 in the x direction.

The heating region 45 in this embodiment includes a plurality of heating members 50. The plurality of heating members 50 include a first end heating member 51, a central heating member 52, and a second end heating member 53 which are arranged in the y direction. The central heating member 52 is located at the center in the y direction of the heating region 45. The central heating member 52 may be formed by combining a plurality of sub-heating members arranged in the y direction. The first end heating member 51 is located next to the central heating member 52 in the +y direction and is located at an end in the +y direction of the heating region 45. The second end heating member 53 is located next to the central heating member 52 in the −y direction and is located at an end in the −y direction of the heating region 45.

Wires of the wiring set 55 are connected to the plurality of heating members 50. The heating region 45 radiates heat when a current is supplied thereto via the wiring set 55. A sheet S with a small width in the y direction passes through the center in the y direction of the fixing device 30. In this case, the controller 6 causes only the central heating member 52 located inward out of the plurality of heating members 50 to radiate heat. On the other hand, in case of a sheet S with a large width in the y direction, the controller 6 causes all the heating members 50 to radiate heat.

As shown in FIG. 4, the heating members 50 and the wiring set 55 are formed on the +z-direction surface of the insulating layer 44. A protection layer 46 is formed of a glass material or the like to cover the heating members 50 and the wiring set 55. The protection layer 46 forms the first surface 41 of the heater unit 40. When the heater unit 40 radiates heat, viscosity of grease 47 between the protection layer 46 and the cylindrical member 37 is lowered and thus slidability between the heater unit 40 and the cylindrical member 37 is secured.

Similarly to the insulating layer 44 formed in the +z direction of the substrate 43, an insulating layer 44 may be formed in the −z direction of the substrate 43. Similarly to the protection layer 46 formed in the +z direction of the substrate 43, a protection layer 46 may be formed in the −z direction of the substrate 43. Accordingly, bending of the substrate 43 is curbed.

As shown in FIG. 3, the whole heating region 45 is included in an area of the fixing nip FN and is disposed at the center of the fixing nip FN. Accordingly, a heat distribution of the fixing nip FN becomes uniform, and a sheet S passing through the fixing nip FN is uniformly heated.

The heat-transfer member 65 is formed of a material with higher thermal conductivity than the substrate 43. For example, the heat-transfer member 65 is formed of a metallic material such as copper or aluminum or a graphite sheet. The heat-transfer member 65 overlaps the heater unit 40 in the z direction. The heat-transfer member 65 has a rectangular plate shape corresponding to the outer shape of the substrate 43 of the heater unit 40. The heat-transfer member 65 overlaps all the heating members 50 in a plan view in the z direction (see FIG. 5). The heat-transfer member 65 comes into contact with at least a part of the second surface 42 of the heater unit 40. The heat-transfer member 65 makes a temperature distribution of the heater unit 40 uniform.

The holder 38 is formed of a resin material such as liquid crystal polymer. The holder 38 has a length in the y direction. The holder 38 is provided to cover a part in the −z direction of the heater unit 40 and a part located at both ends in the x direction.

The holder 38 holds the heater 36. The holder 38 holds only both ends in the y direction of the substrate 43 of the heater unit 40 not to depart in the +z direction in a state in which the heat-transfer member 65 is interposed between the holder 38 and the heater unit 40. Both ends in the x direction of the holder 38 are chamfered in a round shape. The holder 38 supports the inner circumferential surface of the cylindrical member 37 at both ends in the x direction of the heater unit 40.

The holder 38 includes a base 381, an upstream wall 382, and a downstream wall 383. The base 381 supports the heater 36 and the second surface 42 of the heater unit 40. The holder 38 interposes an insulating sheet between the base 381 and the heat-transfer member 65. For example, the insulating sheet is a polyimide sheet. The upstream wall 382 protrudes from an end in the −x direction of the base 381 toward the roller 31. The downstream wall 383 protrudes from an end in the +x direction of the base 381 toward the roller 31. The heater 36 is disposed between the upstream wall 382 and the downstream wall 383. Edges in the +z direction of the upstream wall 382 and the downstream wall 383 extend in the y direction. The edges in the +z direction of the upstream wall 382 and the downstream wall 383 are located substantially at the same position as the first surface 41 of the heater unit 40 in the z direction.

The stay 39 is formed of a steel sheet material or the like. The stay 39 has a length in the y direction. A section perpendicular to the y direction of the stay 39 has a U-shape. The stay 39 is attached to the holder 38 in the −z direction such that the U-shaped opening is covered with the base 381 of the holder 38. Both ends in the y direction of the stay 39 are fixed to the frame 34. The stay 39 improves bending rigidity of the film unit 35.

The thermo-sensitive element 60 is disposed at a position in the −z direction of the heater unit 40. The thermo-sensitive element 60 is disposed in a region overlapping the heating region 45 in the y direction. The thermo-sensitive element 60 is in contact with the −z-direction surface of the heat-transfer member 65 via the insulating sheet interposed between the base 381 of the holder 38 and the heat-transfer member 65. The thermo-sensitive element 60 is disposed inside of a hole 384 penetrating the base 381 of the holder 38 in the z direction. A wire of the thermo-sensitive element 60 is drawn in the −z direction from the hole 384 of the holder 38. The thermo-sensitive element 60 includes a thermometer 61 and a thermostat 62. The thermometer 61 is a thermistor. In the following description, the thermometer 61 and the thermostat 62 may be referred to as a plurality of thermo-sensitive elements 60.

Figure 6:
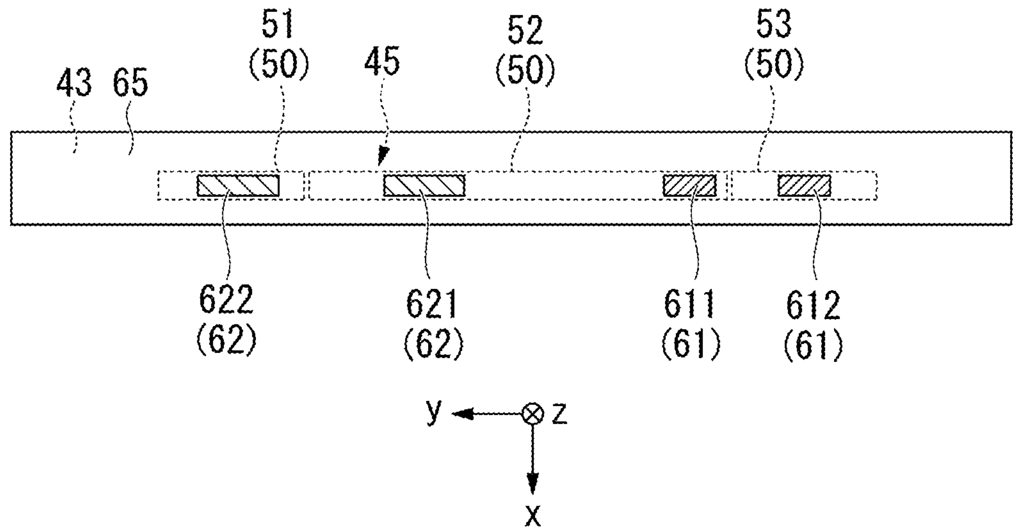
FIG. 6 is a plan view showing a thermometer and a thermostat.

FIG. 6 is a plan view (a view in the −z direction) of the thermometer and the thermostat. In FIG. 6, the holder 38 is not shown.

As shown in FIG. 6, the thermometer 61 detects the temperature of the heater 36. The thermometer 61 detects the temperature of the heater unit 40 via the heat-transfer member 65. The thermometer 61 includes a central thermometer 611 and an end thermometer 612. The thermostat 62 includes a central thermostat 621 and an end thermostat 622. The central thermometer 611 and the central thermostat 621 are disposed at a position in the −z direction of the central heating member 52. On the other hand, the end thermostat 622 and the end thermometer 612 are disposed at positions in the −z direction of the first end heating member 51 and the second end heating member 53.

The thermometer 61 and the thermostat 62 are arranged in the y direction. Specifically, the end thermometer 612, the central thermometer 611, the central thermostat 621, and the end thermostat 622 are sequentially arranged in the +y direction. Specifically, the central thermometer 611 and the central thermostat 621 are arranged to face the center of the heater unit 40 in the y direction. The end thermometer 612 is disposed near the central thermometer 611 in the −y direction. In other words, the end thermometer 612 is disposed between the end in the −y direction of the substrate 43 of the heater unit 40 and the central thermometer 611. The end thermostat 622 is disposed near the central thermostat 621 in the +y direction. In other words, the end thermostat 622 is disposed between the end in the +y direction of the substrate 43 of the heater unit 40 and the central thermostat 621.

As shown in FIG. 3, each of the plurality of thermo-sensitive elements 60 is biased in the +z direction by a biasing member to protrude from the hole 384 of the holder 38 toward the heater unit 40. Each thermo-sensitive element 60 pushes the heater 36 to the holder 38 in the +z direction. The thermo-sensitive element 60 indirectly pushes the heater unit 40 to the holder 38 in the +z direction by pushing the heat-transfer member 65 in the +z direction.

Figure 7:
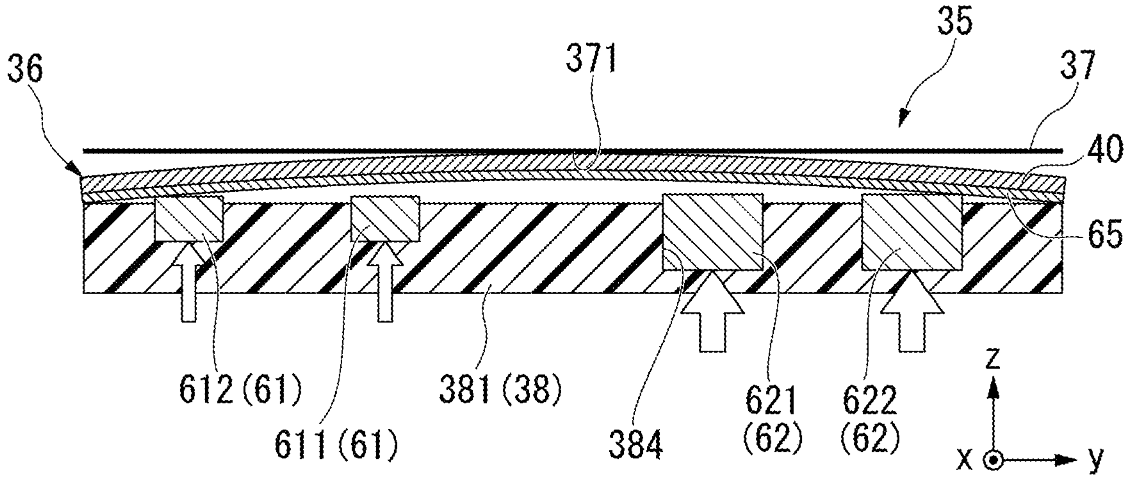
FIG. 7 is a cross-sectional view showing a film unit taken along line VII-VII shown in FIG. 3.

FIG. 7 is a cross-sectional view showing the film unit taken along line VII-VII shown in FIG. 3.

FIG. 7 shows a state in which the roller 31 is separated from the film unit 35. The state shown in FIG. 7 is an example of a third state. As shown in FIG. 7, the heater 36 is configured to be pushed by the thermometer 61 and the thermostat 62. The heater 36 is pushed by the thermometer 61 and the thermostat 62 and is partially separated from the base 381 of the holder 38. Both ends in the y direction of the heater unit 40 are held by the holder 38. Accordingly, the whole region of the heater 36 overlapping the heating region 45 in the y direction is bent to form a gap between the base 381 of the holder 38 and the heater 36.

Particularly, since only both ends in the y direction of the substrate 43 of the heater unit 40 are held not to depart in the +z direction, the heater 36 is bent to form a gap between both ends in the y direction of the substrate 43. For example, the heater 36 is bent in an arc shape. Accordingly, regarding the magnitude of the gap in the z direction, the magnitude of the gap is the largest at the center in the y direction, and the magnitude of the gap is the smallest at the ends in the y direction. The magnitude of the gap at the ends in the y direction is, for example, zero.

The end thermometer 612, the central thermometer 611, the central thermostat 621, and the end thermostat 622 are provided in the film unit 35. In a state in which the heater 36 is bent, the end thermometer 612 and the end thermostat 622 are in contact with the heat-transfer member 65, and the central thermometer 611 and the central thermostat 621 are separated from the heat-transfer member 65. Here, the end thermometer 612 and the end thermostat 622 are examples of an end sensor. The central thermometer 611 and the central thermostat 621 are examples of a central sensor. The heater 36 is pushed to the roller 31 by the end thermometer 612 and the end thermostat 622.

The cylindrical member 37 includes a contact portion 371 that comes into contact with the center in the y direction of the heater 36. The cylindrical member 37 is pushed to the center in the y direction of the heater 36 to form a gap between the heater unit 40 and the cylindrical member 37. The gap between the cylindrical member 37 and the heater unit 40 increases toward the outside in the y direction from the contact portion 371.

As shown in FIG. 6, the thermostat 62 cuts off supply of a current to the heating member 50 when the temperature of the heater unit 40 sensed via the heat-transfer member 65 is higher than a predetermined temperature. As a result, excessive heating of the cylindrical member 37 by the heater unit 40 is curbed.

As shown in FIG. 3, the film thermometers 64 are in contact with a part of the inner circumferential surface of the cylindrical member 37. The film thermometers 64 are arranged at intervals in the y direction. The film thermometers 64 sense the temperatures of different parts in the y direction of the cylindrical member 37.

Figure 8:
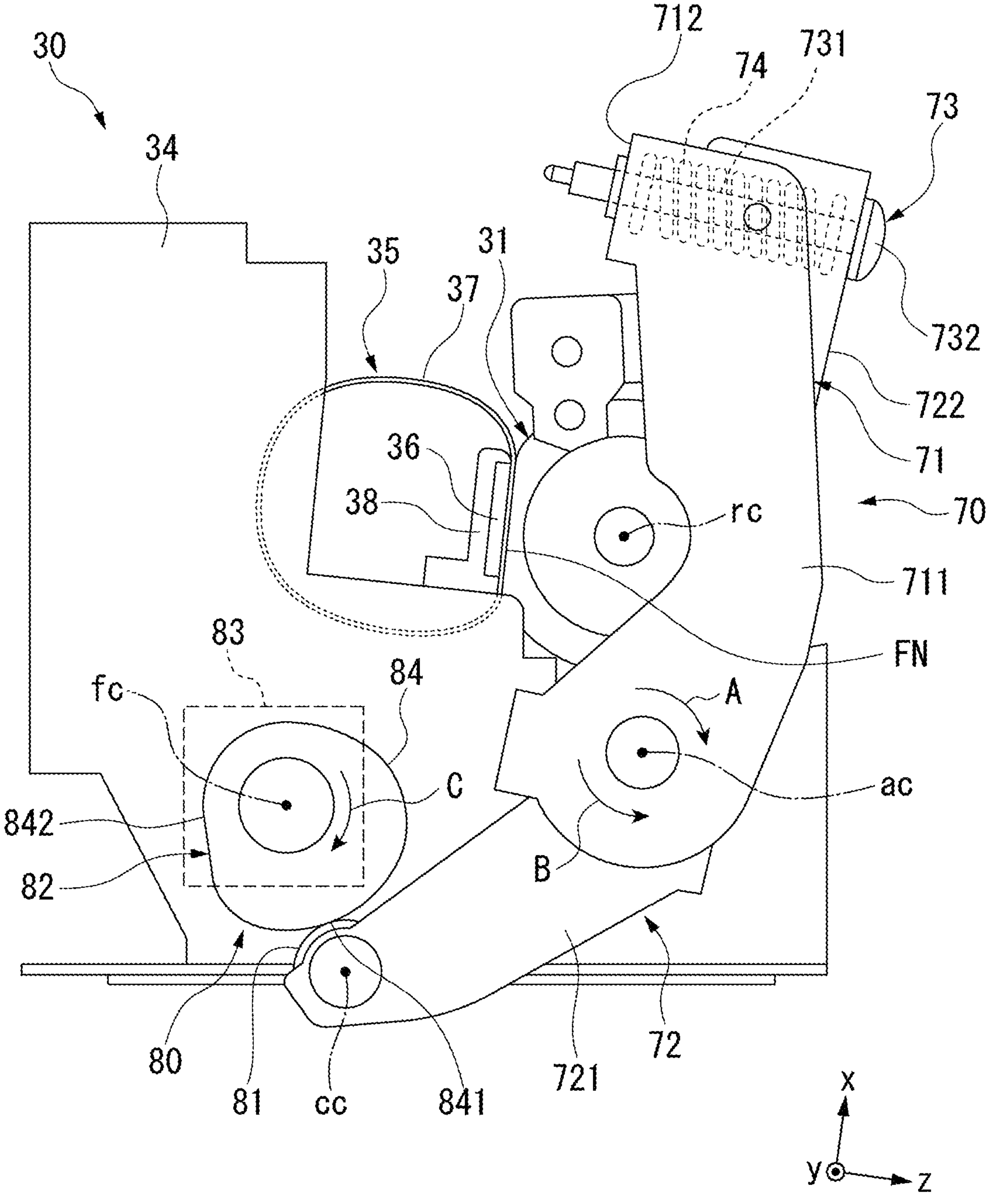
FIG. 8 is a front view showing a fixing device.

FIG. 8 is a front view showing the fixing device.

As shown in FIG. 8, the pressing mechanism 70 presses the roller 31 to the cylindrical member 37. The pressing mechanism 70 is configured to change a pressure between the roller 31 and the cylindrical member 37. The pressure is a pressure applied between the roller 31 and the cylindrical member 37. In other words, the pressing mechanism 70 is configured to control the pressure. For example, the pressing mechanism 70 is configured to apply a first pressure between the roller 31 and the cylindrical member 37, and the pressing mechanism 70 is configured to apply a second pressure between the roller 31 and the cylindrical member 37. Here, the second pressure is smaller than the first pressure. The pressing mechanism 70 is configured to change the pressure so as to switch a state between the roller 31 and the cylindrical member 37. Here, the "state between the roller 31 and the cylindrical member 37" means, for example, a state in which the fixing nip FN is formed or not, a state in which the roller 31 and the cylindrical member 37 are in contact with each other or not, a state in which the roller 31 is separated from the cylindrical member 37 or not, or a state in which the magnitude of a force applied between the roller 31 and the cylindrical member 37 changes in a state in which the roller 31 and the cylindrical member 37 are in contact with each other.

The pressing mechanism 70 is configured to displace the roller 31 relative to the cylindrical member 37 such that a pressing-roller rotation center rc approaches or is separated from the cylindrical member 37 in a state in which the roller 31 is in contact with the cylindrical member 37. The pressing mechanism 70 can switch the aforementioned state to a first state or a second state. The first state is a state in which the fixing nip FN is formed between the roller 31 and the cylindrical member 37. The second state is a state in which a force applied between the cylindrical member 37 and the roller 31 is smaller than that in the first state. FIG. 8 shows a case in which the pressing mechanism 70 is in the first state. The fixing nip FN is defined as a state in which an operation of fixing a toner image to a sheet S can be performed by the fixing device 30. The second state corresponds to an energy save mode or a sleep state. For example, the sleep state is a state in which a current is supplied to the memory 92 but a current is not supplied to the heater unit 40. In the second state, plastic deformation of the cylindrical member 37 is prevented by relaxing pressing of the roller 31 to the cylindrical member 37.

The pressing mechanism 70 includes an arm 71, a pusher 72, a pin 73, and an elastic member 74. The constituent members of the pressing mechanism 70 are provided at both ends in the y direction of the roller 31. The pressing mechanism 70 is symmetric with respect to an xz plane passing through a center point in the y direction of the roller 31. The constituent members of the pressing mechanism 70 disposed in the +y direction of the roller 31 will be described below.

The arm 71 has a length in the x direction. The arm 71 may be formed of a steel sheet material or the like. The arm 71 can rotate around an arm rotation center ac. The arm rotation center ac is located near the end in the −x direction of the arm 71, and the center axis passing through the arm rotation center ac is parallel to the y direction.

The arm 71 includes an arm main plate 711 and an arm connection portion 712.

The arm main plate 711 is parallel to the xz plane. A pair of arm main plates 711 has a gap in the y direction therebetween. A semicircular cutout that rotatably supports the roller 31 is formed in the arm main plate 711 in the −y direction.

The arm connection portion 712 connects the ends in the −z direction of the pair of arm main plates 711 to each other. The arm connection portions 712 are located at both ends in the x direction of the arm 71.

The pusher 72 may be formed of a steel sheet material or the like. The pusher 72 can rotate around the arm rotation center ac. The arm rotation center ac is located at the center in the x direction of the pusher 72. One side of the pusher 72 has a length in the +x direction from the arm rotation center ac. The other side of the pusher 72 has a length in the −x direction and the −z direction from the arm rotation center ac.

The pusher 72 includes a pusher main plate 721 and the pusher connection portion 722.

The pusher main plate 721 is parallel to the xz plane. A pair of pusher main plates 721 has a gap in the y direction. The pair of pusher main plates 721 is located internally in the y direction of the pair of arm main plates 711.

The pusher connection portion 722 connects the ends in the +z direction of the pair of pusher main plates 721 to each other.

The pin 73 is located at the end in the +x direction of the arm 71 and the pusher 72. The pin 73 is parallel to the z direction. The pin 73 includes a body 731 and a head 732.

The body 731 has a cylindrical shape. A first end in the −z direction of the body 731 is fixed to the arm connection portion 712 with screwing or the like. The body 731 has a length in the +z direction from the arm connection portion 712 to the pusher connection portion 722. The body 731 is inserted into a through-hole formed in the pusher connection portion 722 and has a length in the +z direction of the pusher connection portion 722.

The head 732 is located at a second end in the +z direction of the body 731. The head 732 has a larger diameter than that of the through-hole of the pusher connection portion 722.

The elastic member 74 is supported by the pin 73. The elastic member 74 is located on the same side (the +x direction) as a pressing-roller rotation center rc with respect to the arm rotation center ac. The elastic member 74 is located between the arm 71 and the pusher 72. The elastic member 74 is located in a compressed state between the arm connection portion 712 and the pusher connection portion 722. The elastic member 74 biases the arm 71 in a direction in which the roller 31 comes into contact with the cylindrical member 37. The elastic member 74 is a coil spring. The elastic member 74 is externally fitted to the body 731 of the pin 73.

The movement mechanism 80 moves the pressing mechanism 70 such that the aforementioned state of the pressing mechanism 70 is switched to the first state or the second state. The pressing mechanism 70 can be switched to only one of the first state and the second state through operation of the movement mechanism 80. The movement mechanism 80 includes a cam follower 81, a cam 82, and a drive source 83. The cam follower 81 and the cam 82 are provided at both ends in the y direction of the roller 31. The cam follower 81 is symmetric with respect to the xz plane passing through a center point in the y direction of the roller 31. The cam 82 is symmetric with respect to the xz plane passing through the center point in the y direction of the roller 31. The cam follower 81 and the cam 82 in the +y direction of the roller 31 will be described below.

The cam follower 81 is located at an end in the −x direction and the −z direction of the pusher 72. The cam follower 81 is located in a cylindrical shape between the pair of pusher main plates 721. The cam follower 81 is a roller member that can rotate around a cam-follower rotation center fc parallel to the y direction.

The cam 82 is located near the cam follower 81 in the +x direction of the cam follower 81. The cam 82 can rotate around a cam rotation center cc. A cam surface 84 forming the outline of the cam 82 can come into contact with the outer circumferential surface of the cam follower 81. A pair of cams 82 located at both ends in the y direction of the roller 31 is connected by a cam shaft having a length in the y direction. The cam rotation center cc is located on the side opposite to the pressing-roller rotation center rc with respect to the arm rotation center ac. The cam 82 rotates in only a direction of an arrow C around the cam rotation center cc with an output of the drive source 83. A rotation angle of the cam 82 is detected by a sensor.

The cam surface 84 is formed such that a distance from the cam surface 84 to the cam rotation center cc changes according to the rotation angle of the cam 82. In the following description, the distance from the cam rotation center cc to the cam surface 84 is referred to as an outer radius. The cam surface 84 includes a large-radius portion 841 having the largest outer radius in the cam surface 84 and a small-radius portion 842 having the smallest outer radius in the cam surface 84. The cam surface 84 extends continuously in the direction opposite to a rotating direction of the cam 82 from the large-radius portion 841 to the small-radius portion 842. The outer radius of the cam surface 84 decreases gradually in the direction opposite to the rotating direction of the cam 82 from the large-radius portion 841 to the small-radius portion 842. With rotation of the cam 82, the cam surface 84 is configured such that the cam follower 81 can roll continuously over the whole circumference thereof.

The drive source 83 rotationally drives the cam shaft connecting the pair of cams 82 via a worm gear or the like. The drive source 83 rotationally drives the cam shaft such that the pair of cams 82 rotates. The drive source 83 rotates the cam 82 in only one direction around the cam rotation center cc. The drive source 83 is controlled by the controller 6.

The operation of the pressing mechanism 70 will be described below.

When a fixing operation is performed by the fixing device 30, the movement mechanism 80 brings the roller 31 into contact with the cylindrical member 37. In FIG. 8, the first state in which the roller 31 is brought into contact with the cylindrical member 37 is shown. The cam follower 81 is in contact with the large-radius portion 841 of the cam 82 in the first state. In the first state, the fixing nip FN is formed by the cylindrical member 37 and the roller 31. In the first state, the roller 31 is elastically deformed.

Figure 9:
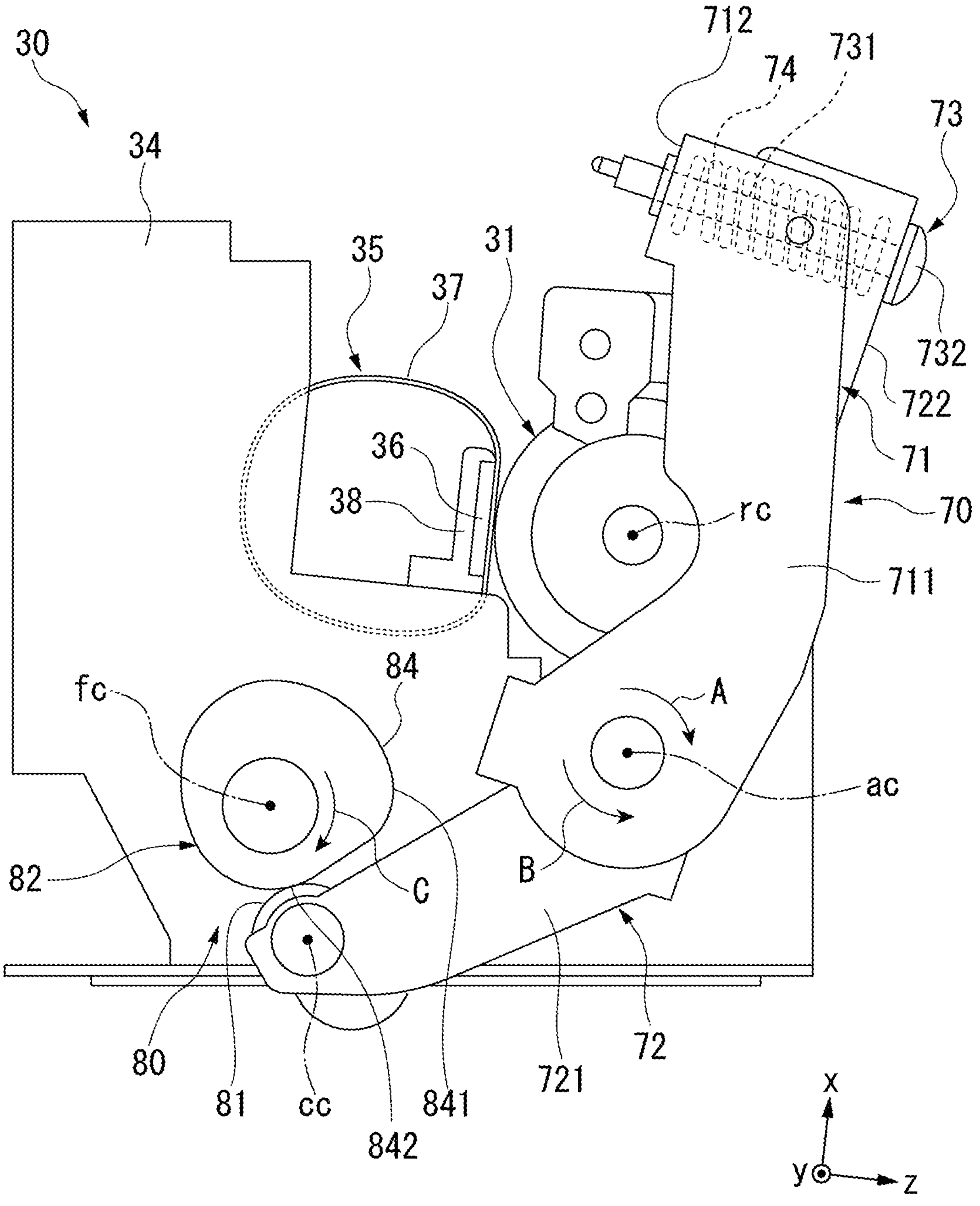
FIG. 9 is a diagram showing operations of a pressing mechanism.

FIG. 9 is a diagram showing the operation of the pressing mechanism 70. FIG. 9 shows a case in which the pressing mechanism 70 is in the second state. The cam follower 81 is in contact with the small-radius portion 842 of the cam 82 in the second state. In the second state, the cylindrical member 37 and the roller 31 are in contact with each other, and a force applied between the cylindrical member 37 and the roller 31 is smaller than that in the first state. In the second state, a width in the x direction of a nip formed by the cylindrical member 37 and the roller 31 is smaller than a width in the x direction of the fixing nip FN. In the second state, the roller 31 may be elastically deformed.

A switching operation from the first state to the second state and a switching operation from the second state to the first state which are performed by the movement mechanism 80 will be described below.

In the first state shown in FIG. 8, the roller 31 is elastically deformed with a reaction force for pressing the cylindrical member 37 between the roller 31 and the heater unit 40. A force in the +z direction is applied to the roller 31 due to a restoring force of the elastic deformation. When the force in the +z direction is applied to the roller 31, the roller 31 pushes the arm 71 around the arm rotation center ac in the direction of an arrow A. The arm 71 pushed by the roller 31 is presses the pusher 72 around the arm rotation center ac in the direction of the arrow A via the compressed elastic member 74 and presses the cam follower 81 to the cam 82. The pusher 72 presses the roller 31 to the cylindrical member 37 via the elastic member 74 and the arm 71 due to the reaction force for pushing the cam follower 81 to the cam 82.

In the first state, the cam 82 rotates around the cam rotation center cc in the direction of an arrow C. The cam follower 81 approaches the cam rotation center cc while relatively moving from the large-radius portion 841 to the small-radius portion 842 along the cam surface 84 of the cam 82. The pusher 72 permits rotation around the arm rotation center ac in the direction of the arrow A. The pusher 72 rotates around the arm rotation center ac in the direction of the arrow A due to the restoring force of the elastic member 74. With rotation of the pusher 72, the arm 71 rotates around the arm rotation center ac in the direction of the arrow A such that the restoring force of the elastic member 74 and the restoring force of the roller 31 match. When the arm 71 rotates around the arm rotation center ac in the direction of the arrow A, the roller 31 is displaced in the +z direction such that the pressing-roller rotation center rc is apart from the film unit 35.

When the cam 82 rotates around the cam rotation center cc in the direction of the arrow C, the pusher 72 rotates around the arm rotation center ac in the direction of the arrow A. The cam follower 81 comes into contact with the small-radius portion 842 of the cam surface 84 of the cam 82, and the pusher 72 has rotated fully around the arm rotation center ac in the direction of the arrow A, which is the second state. In the second state, the roller 31 is in contact with the cylindrical member 37 over the whole length in the y direction of the cylindrical member 37. The force applied from the roller 31 to the cylindrical member 37 is smaller than that in the first state. In the second state, the roller 31 presses the heater unit 40 and the heat-transfer member 65 in the −z direction via the cylindrical member 37 such that the heat-transfer member 65 does not form a gap between the base 381 of the holder 38 and the heat-transfer member 65. In other words, in the second state, the fixing nip FN is not formed in the pressing mechanism 70. In this case, the cylindrical member 37 and the roller 31 are in contact with each other.

In the second state, the cam 82 rotates around the cam rotation center cc in the direction of the arrow C. The cam follower 81 is separated from the cam rotation center cc while relatively moving from the small-radius portion 842 to the large-radius portion 841 along the cam surface 84 of the cam 82. The pusher 72 rotates around the arm rotation center ac in the direction of the arrow B while compressing the elastic member 74. With rotation of the pusher 72, the arm 71 rotates around the arm rotation center ac in the direction of the arrow B by receiving the restoring force of the elastic member 74. The arm 71 presses the roller 31 to the cylindrical member 37 by rotating around the arm rotation center ac in the direction of the arrow B. The roller 31 is displaced in the −z direction such that the pressing-roller rotation center re approaches the film unit 35 by pressing the cylindrical member 37.

When the cam 82 rotates around the cam rotation center cc in the direction of the arrow C, the pusher 72 rotates around the arm rotation center ac in the direction of the arrow B. The cam follower 81 comes into contact with the large-radius portion 841 of the cam surface 84 of the cam 82, and the pusher 72 rotates fully around the arm rotation center ac in the direction of the arrow B, which is the first state. As described above, the movement mechanism 80 switches the pressing mechanism 70 from the first state to the second state or switches the pressing mechanism 70 from the second state to the first state.

An amount of deformation of the elastic layer 33 in the second state is smaller than an amount of deformation of the elastic layer 33 in the first state.

Figure 10:
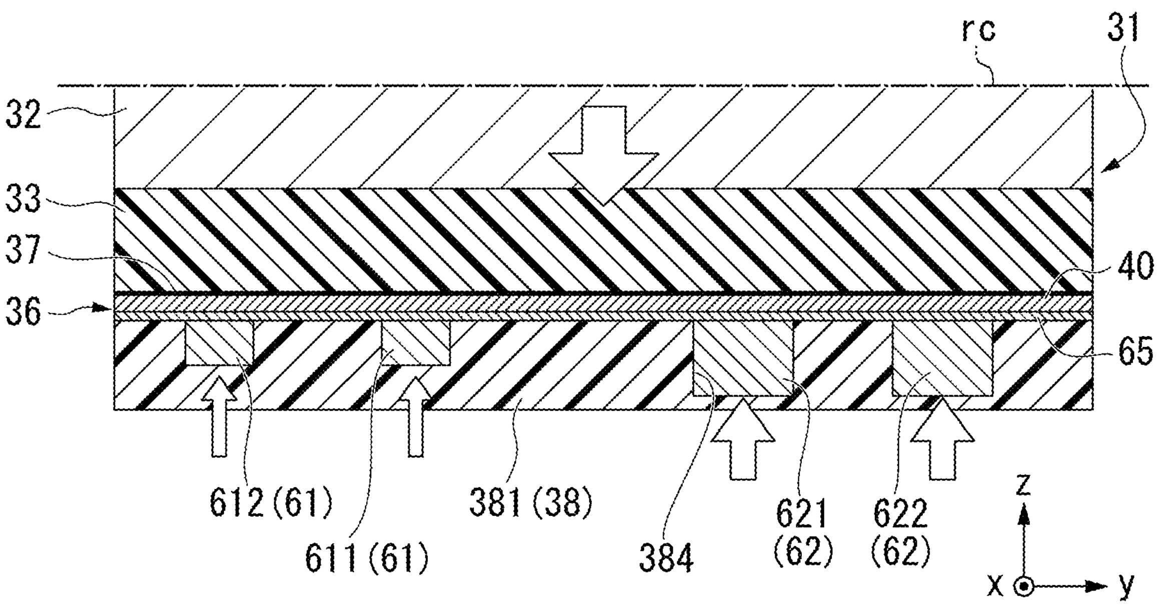
FIG. 10 is a cross-sectional view showing the fixing device taken along line VII-VII shown in FIG. 3.

FIG. 10 is a cross-sectional view showing the fixing device taken along line VII-VII shown in FIG. 3 and showing a case in which the pressing mechanism is in the second state.

In the second state shown in FIG. 10, the roller 31 presses the heat-transfer member 65 to the base 381 of the holder 38 via the cylindrical member 37 and the heater unit 40 such that the heat-transfer member 65 does not float from the base 381. In this state, protruding of the thermo-sensitive element 60 from the hole 384 of the holder 38 to the heater unit 40 is regulated by the heat-transfer member 65. In the first state, the force applied between the cylindrical member 37 and the roller 31 is larger than that in the second state. Accordingly, the roller 31 presses the heat-transfer member 65 to the base 381 via the cylindrical member 37 and the heater unit 40 such that the heat-transfer member 65 does not float from the base 381 of the holder 38. In all the switchable states based on the operation of the movement mechanism 80, the heat-transfer member 65, the heater unit 40, and the thermo-sensitive element 60 are pressed to the holder 38 by the roller 31 and are immovable relative to the holder 38.

Unlike the third state shown in FIG. 7, in the second state shown in FIG. 10, the central thermometer 611 and the central thermostat 621 are in contact with the heat-transfer member 65, and the end thermometer 612 and the end thermostat 622 are in contact with the heat-transfer member 65.

A functional configuration of the controller 6 will be described below.

Figure 11:
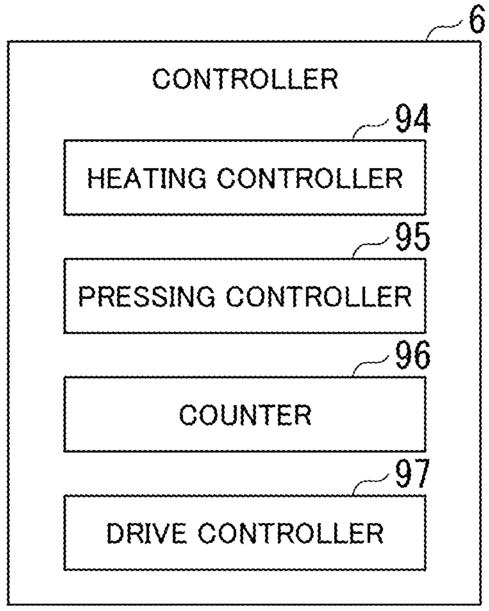
FIG. 11 is a block diagram showing a functional configuration of a controller.

FIG. 11 is a block diagram showing the functional configuration of the controller.

As shown in FIG. 11, the controller 6 includes a heating controller 94, a pressing controller 95, a counter 96, and a drive controller 97. More specifically, the controller 6 includes, for example, a recording medium and a processor. In other words, each of the heating controller 94, the pressing controller 95, the counter 96, and the drive controller 97 may include the recording medium and the processor. In the recording medium, for example, a computer program that controls the image forming device 1 is stored. The processor is configured to process various information. The various information is, for example, information stored in the recording medium, information obtained by executing the computer program, or the like. The controller 6 comprehensively controls the operation of the image forming device 1.

The heating controller 94 supplies a current to the heater unit 40 in a heating mode and stops supply of a current to the heater unit 40 in a stop mode. The heating controller 94 measures the temperature of the heating region 45 using the thermometer 61 when the fixing device 30 is started. When the temperature of the heating region 45 is lower than a predetermined temperature, the heating controller 94 causes the heating region 45 to radiate heat for a short time before rotation of the roller 31 is started. With the radiation of heat from the heating region 45, the viscosity of the grease 47 applied to the inner circumferential surface of the cylindrical member 37 decreases. Accordingly, slidability between the heater unit 40 and the cylindrical member 37 at the time of starting of rotation of the roller 31 is secured.

The heating controller 94 measures the temperature of the heat-transfer member 65 using the thermometer 61 when the fixing device 30 operates. The heating controller 94 controls supply of a current to the heating region 45 based on temperature measurement results of the heat-transfer member 65. Accordingly, the temperature of the heat-transfer member 65 in contact with the holder 38 is maintained lower than the heat-resistant temperature of the holder 38.

The heating controller 94 measures the temperatures of the constituent members in the y direction of the cylindrical member 37 using the film thermometer 64 when the fixing device 30 operates. The heating controller 94 controls supply of a current to the heating region 45 based on the temperature measurement results of the constituent members in the y direction of the cylindrical member 37.

The pressing controller 95 controls the movement mechanism 80. The pressing controller 95 controls the drive source 83 of the movement mechanism 80 such that the state of the pressing mechanism 70 is switched to the first state or the second state. The pressing controller 95 determines whether the state of the pressing mechanism 70 is the first state or the second state based on a sensing result from a sensor detecting a rotation angle of the cam 82 and stops driving of the drive source 83 for rotating the cam 82. The pressing controller 95 controls the drive source 83 of the movement mechanism 80 such that the pressing mechanism 70 is switched to the second state when the temperature sensed by the thermometer 61 is equal to or less than a predetermined value in a stop mode of the heating controller 94.

The counter 96 counts at least one of switching from the first state to the second state and switching from the second state to the first state.

The drive controller 97 limits switching to the second state when the counted value of the counter 96 is equal to or greater than a predetermined value.

In this embodiment, the pressing mechanism 70 can switch between the first state in which the fixing nip FN is formed by the cylindrical member 37 and the roller 31 and the second state in which the cylindrical member 37 and the roller 31 are in contact with each other and a force applied between the cylindrical member 37 and the roller 31 is smaller than that in the first state. With this configuration, when the pressing mechanism 70 is switched to the first state or the second state, the heater 36 held by the holder 38 is not displaced. Since the heater 36 is not displaced, fluctuation of a load applied to the thermometer 61 in contact with the heater 36 can be curbed. Accordingly, it is possible to curb deterioration of internal elements in the thermometer 61 and to improve durability of the fixing device 30. These advantages are remarkable when the thermometer 61 is a thermistor.

The movement mechanism 80 includes the cam 82 in which the small-radius portion 842 with the smallest outer radius in the cam surface 84 comes into contact with the cam follower 81 in the second state. With this configuration, the cam follower 81 is closest to the cam rotation center cc of the cam 82 in the second state. Accordingly, even when the cam 82 rotates in only one direction, the pressing mechanism 70 can enter only one of the first state and the second state regardless of the rotation angle of the cam 82 when the cam 82 rotates. As a result, it is possible to reliably prevent displacement of the heater 36 when the cam 82 rotates.

The pressing mechanism 70 can be switched to a third state. In the third state, the holder 38 holds the heater 36 such that the roller 31 is separated from the cylindrical member 37 and a gap is formed between the heater 36 and the holder 38. With this configuration, when the roller 31 is separated from the cylindrical member 37, the heater 36 is displaced to cause fluctuation of a load applied to the thermometer 61.

Accordingly, in the fixing device 30 according to this embodiment, the cylindrical member 37 and the roller 31 come into contact with each other to limit displacement of the heater 36 even in the second state, which is suitable for obtaining the aforementioned operations and advantages.

The heat-transfer member 65 is provided between the base 381 of the holder 38 and the heater unit 40. With this configuration, the number of components which are deformed or displaced due to change of a pressure applied from the roller 31 to the film unit 35 increases in comparison with a configuration in which the heat-transfer member is not provided. Accordingly, the number of elements generating fluctuation of a load in the thermometer 61 can be increased and deterioration of the internal elements in the thermometer 61 can be promoted. As a result, with the fixing device 30 according to this embodiment, displacement of the heater 36 is limited, which is suitable for obtaining the aforementioned operations and advantages.

When the state of the pressing mechanism 70 is switched to the first state or the second state, displacement of the heater 36 is limited by the roller 31. With this configuration, it is possible to curb fluctuation of a load applied to the thermometer 61. Accordingly, it is possible to achieve the aforementioned operations and advantages.

The heater 36 is held by the holder 38 outside of the heating region 45 in the axial direction. With this configuration, in a state in which the roller 31 is separated from the film unit 35, the heater 36 can be pushed and bent by the thermometer 61, and the load applied to the thermometer 61 fluctuates due to bending of the heater 36. Accordingly, with the fixing device 30 according to this embodiment, since the cylindrical member 37 and the roller 31 come into contact with each other to limit displacement of the heater 36 even in the second state, it is possible to appropriately achieve the aforementioned operations and advantages.

The heater 36 is pushed to the roller 31 by the thermometer 61. With this configuration, when the heater 36 is displaced, the load applied to the thermometer 61 pressing the heater 36 also fluctuates. Accordingly, with the fixing device 30 according to this embodiment, since the cylindrical member 37 and the roller 31 come into contact with each other to limit displacement of the heater 36 even in the second state, it is possible to appropriately achieve the aforementioned operations and advantages.

The cylindrical member 37 includes the contact portion 371 coming into contact with the heater 36 in a state in which the cylindrical member 37 is separated from the roller 31. The cylindrical member 37 forms a gap increasing outward in the y direction from the contact portion 371 between the heater 36 and the cylindrical member 37 in the state in which the cylindrical member 37 is separated from the roller 31. With this configuration, when the roller 31 is separated from the cylindrical member 37, the cylindrical member 37 is pushed to the heater 36 and is deformed to form a gap from the heater 36. Accordingly, with the fixing device 30 according to this embodiment, since the cylindrical member 37 and the roller 31 come into contact with each other to limit displacement of the heater 36 and deformation of the cylindrical member 37 even in the second state, it is possible to curb deterioration due to repeated deformation of the cylindrical member 37.

When the temperature sensed by the thermometer 61 is equal to or less than a predetermined value, the pressing controller 95 controls the drive source 83 of the movement mechanism 80 such that the pressing mechanism 70 is switched to the second state. With this configuration, it is possible to curb switching to the second state in a situation in which the temperature sensed by the thermometer 61 is higher than the predetermined value and there is a high likelihood that the fixing device 30 will be immediately used. Accordingly, it is possible to curb frequent operation of the movement mechanism 80 and to more effectively curb deterioration of the internal elements in the thermometer 61.

The counter 96 counts at least one of switching of the pressing mechanism 70 from the first state to the second state and switching of the pressing mechanism 70 from the second state to the first state. The drive controller 97 controls the movement mechanism 80. The drive controller 97 limits switching to the second state when the counted value of the counter 96 is equal to or greater than a predetermined value. With this configuration, it is possible to prevent a degree of deterioration of the internal elements in the thermometer 61 from exceeding a predetermined criterion. Accordingly, it is possible to avoid a failure due to a service life of the thermometer 61.

The controller 6 may control the constituents of the image forming device 1 such that the process of forming an image on a sheet S in the second state is limited. With this configuration, it is possible to curb carrying of a sheet S to the fixing device 30 in a state in which the fixing nip FN is not formed.

In the first embodiment, the heater 36 includes the heat-transfer member 65, but the heater may not include a heat-transfer member. In this case, the thermo-sensitive element 60 is provided to be in contact with the heater unit 40. With this configuration, even when the state of the pressing mechanism 70 is any of the first state and the second state, the heater unit 40 is configured not to form a gap between the base 381 of the holder 38 and the heater unit 40, which causes the aforementioned operations and advantages.

Second Embodiment

Figure 12:
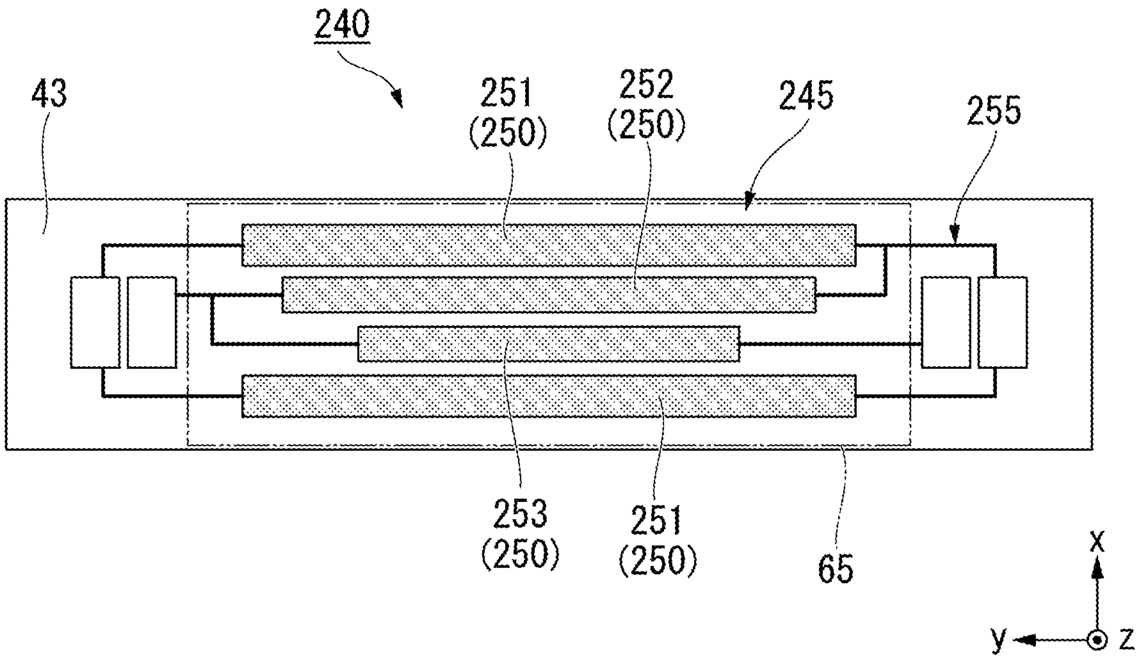
FIG. 12 is a bottom view showing a heater unit according to a second embodiment.

A heater unit 240 according to a second embodiment will be described below with reference to FIG. 12. The constituents not described below are the same as in the first embodiment. FIG. 12 is a bottom view showing the heater unit according to the second embodiment.

In the second embodiment, a layout of heating members 250 of the heater unit 240 is different from that in the first embodiment. The heater unit 240 includes a heating region 245 and a wiring set 255 instead of the heating region 45 and the wiring set 55 in the first embodiment.

The heating region 245 is provided in the substrate 43. The entire outer shape of the heating region 245 is a rectangular shape of which a longitudinal direction is the y direction and a short direction is the x direction.

The heating region 245 includes a plurality of heating members 250. The plurality of heating members 250 include a pair of first heating members 251, a second heating member 252, and a third heating member 253. The plurality of heating members 250 are arranged sequentially in the order of one first heating member 251, the second heating member 252, the third heating member 253, and the other first heating member 251 in the x direction. The heating members 250 have a longitudinal direction parallel to the y direction. The heating members 250 have lengths corresponding to various sheet widths. The second heating member 252 is shorter in the y direction than the first heating member 251. Both ends in the y direction of the second heating member 252 are located inside of both ends in the y direction of the first heating member 251. The third heating member 253 has a smaller length in the y direction than the second heating member 252. Both ends in the y direction of the third heating member 253 are located inside of both ends in the y direction of the second heating member 252. Wires of the wiring set 255 are connected to the heating members 250. The heating region 245 radiates heat with supply of a current via the wiring set 255. The controller 6 causes the corresponding heating members 250 to radiate heat according to the width of a sheet S to be passed.

In the aforementioned second embodiment, since displacement of the heater 36 including the heater unit 240 is limited, it is possible to achieve the same advantages as in the first embodiment.

Third Embodiment

Figure 13:
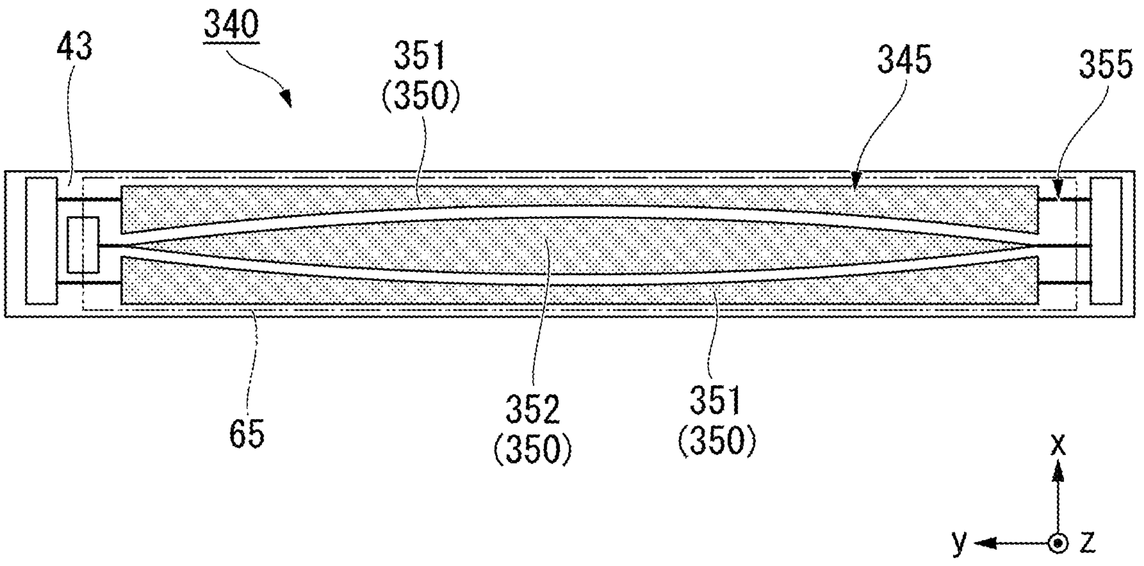
FIG. 13 is a bottom view showing a heater unit according to a third embodiment.

A heater unit 340 according to a third embodiment will be described below with reference to FIG. 13. The constituents not described below are the same as in the first embodiment. FIG. 13 is a bottom view showing the heater unit according to the third embodiment.

In the third embodiment, a layout of heating members 350 of the heater unit 340 is different from that in the first embodiment. The heater unit 340 includes a heating region 345 and a wiring set 355 instead of the heating region 45 and the wiring set 55 in the first embodiment.

The heating region 345 is provided in the substrate 43. The entire outer shape of the heating region 345 is a rectangular shape of which a longitudinal direction is the y direction and a short direction is the x direction.

The heating region 345 includes a plurality of heating members 350. The plurality of heating members 350 include a pair of first heating members 351 and a second heating member 352. The plurality of heating members 350 are arranged sequentially in the order of one first heating member 351, the second heating member 352, and the other first heating member 351 in the x direction. The heating members 350 have a longitudinal direction parallel to the y direction. The first heating members 351 are thickened from the center to an end in the y direction. Both ends of the pair of first heating members 351 in the y direction are located at substantially the same positions. The second heating member 352 is thinned from the center to an end in the y direction. Both ends of the second heating member 352 in the y direction are located at substantially the same positions as both ends of the first heating members 351.

Wires of the wiring set 355 are connected to the heating members 350. The heating region 345 radiates heat with supply of a current via the wiring set 355. The controller 6 causes the corresponding heating members 350 to radiate heat according to the width of a sheet S to be passed. When only the first heating members 351 are caused to radiate heat, an amount of heat radiated from the heating region 345 decreases from the center to an end in the y direction. On the other hand, when the pair of first heating members 351 and the second heating member 352 are simultaneously caused to radiate heat, the amount of heat radiated from the heating region 345 becomes uniform over the total length in the y direction in comparison with the case in which only the first heating members 351 are caused to radiate heat. Accordingly, the controller 6 supplies a current to only the first heating members 351 when a sheet S with a small width is passed. The controller 6 supplies a current to the first heating members 351 and the second heating member 352 when a sheet S with a large width is passed.

In the aforementioned third embodiment, since displacement of the heater 36 including the heater unit 340 is limited, it is possible to achieve the same advantages as in the first embodiment.

In the aforementioned embodiments, the pressing mechanism 70 presses the roller 31 to the cylindrical member 37, but is not limited to this configuration. The pressing mechanism may be configured to press the film unit including the cylindrical member to the roller.

In the aforementioned embodiments, the first surface 41 of the heater unit 40 is in contact with the inner surface of the cylindrical member 37, but the present invention is not limited to this configuration. The heater may include a soaking member interposed between the first surface of the heater unit and the inner circumferential surface of the cylindrical member. In this case, the heater may not include the heat-transfer member interposed between the heater unit and the holder.

According to at least one of the aforementioned embodiments, the state of the pressing mechanism may be switched to the first state or the second state. In the first state, the fixing nip is formed by the cylindrical member and the roller. In the second state, the cylindrical member and the roller come into contact with each other and a force applied between the cylindrical member and the roller becomes smaller than that in the first state. With this configuration, when the state of the pressing mechanism is switched to the first state or the second state, the heater held by the holder is not displaced. Since the heater 36 is not displaced, it is possible to curb fluctuation of a load applied to the thermometer. Accordingly, it is possible to curb deterioration of the internal elements in the thermometer and to improve durability of the fixing device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device comprising:

a cylindrical member;

a heater inside the cylindrical member, the heater having a longitudinal direction along an axial direction of the cylindrical member, the heater having a heating region, the heating region being configured to radiate heat when a current is supplied thereto;

a holder holding the heater;

a sensor in contact with the heater, the sensor being configured to detect a temperature of the heater;

a roller in contact with an outer peripheral face of the cylindrical member, the roller forming a nip between the roller and the cylindrical member; and a pressing mechanism configured to change a pressure between the cylindrical member and the roller, wherein the pressing mechanism is configured to change the pressure so as to switch a state between the cylindrical member and the roller, the state is switched to a first state, a second state, or a third state, in the first state, the cylindrical member and the roller form the nip, in the second state, the cylindrical member and the roller come into contact with each other, and a force applied between the cylindrical member and the roller is smaller than that in the first state, and in the third state, the holder supports the heater such that the roller is separated from the cylindrical member and a gap is formed between the heater and the holder in a region overlapping the heating region in the axial direction, the heater is bent in an arc shape when seen in a direction in which a sheet is carried by the cylindrical member and the roller, the cylindrical member has a contact portion, the contact portion is configured to come into contact with a center of the heater in the axial direction in a state in which the cylindrical member is separated from the roller, the cylindrical member is pushed to the center of the heater in the axial direction to form a gap between the heater and the cylindrical member in the state in which the cylindrical member is separated from the roller, and the gap between the heater and the cylindrical member increases outward in the axial direction from the contact portion.

2. The fixing device according to claim 1, further comprising:

a movement mechanism configured to move the pressing mechanism such that the state of the pressing mechanism is switched to the first state or the second state.

3. The fixing device according to claim 1, wherein the pressing mechanism supports the roller such that the roller is configured to rotate and move in a direction orthogonal to the axial direction, the movement mechanism includes:

a cam follower in the pressing mechanism;

a cam having a cam surface, the cam being configured to rotate, the cam being configured to cause the roller to move in the orthogonal direction in cooperation with the cam follower via the pressing mechanism, the cam surface being in contact with the cam follower, the cam surface having a small-radius portion having a smallest outer radius in the cam surface, the small-radius portion being configured to come into contact with the cam follower in the second state; and a drive source configured to cause the cam to rotate in only one direction.

4. The fixing device according to claim 1, wherein when the state of the pressing mechanism is switched to the first state or the second state, displacement of the heater is limited by the roller.

5. The fixing device according to claim 1, wherein the heater includes a heater unit and a heat-transfer member, and the heat-transfer member is between the heater unit and the holder.

6. The fixing device according to claim 1, wherein the heater is held by the holder outside of the heating region in the axial direction.

7. The fixing device according to claim 5, wherein the sensor is biased toward the heater with respect to the holder, and the heater is pushed to the roller by the sensor.

8. The fixing device according to claim 1, wherein the roller includes an elastic layer, and an amount of deformation of the elastic layer in the second state is smaller than an amount of deformation of the elastic layer in the first state.

9. The fixing device according to claim 1, wherein in a case in which the nip is not formed in the pressing mechanism, the cylindrical member and the roller are in contact with each other.

10. The fixing device according to claim 5, wherein the sensor includes a central sensor and an end sensor, and in the third state, the central sensor is separated from the heat-transfer member, and the end sensor is in contact with the heat-transfer member.

11. The fixing device according to claim 10, wherein the central sensor and the end sensor are supported by the holder, the central sensor is arranged to face a center of the heater unit, and the end sensor is disposed between an end of the heater unit and the central sensor.

12. The fixing device according to claim 11, wherein the heater is pushed to the roller by the end sensor.

13. The fixing device according to claim 1, wherein the heater includes a heater unit and a heat-transfer member, the heat-transfer member is between the heater unit and the holder, the sensor includes a central sensor and an end sensor, and in the second state, the central sensor and the end sensor are in contact with the heat-transfer member.

14. The fixing device according to claim 13, wherein the central sensor and the end sensor are supported by the holder, the central sensor is arranged to face a center of the heater unit, and the end sensor is disposed between an end of the heater unit and the central sensor.

15. An image processing device comprising:

a cylindrical member;

a heater inside the cylindrical member, the heater having a longitudinal direction along an axial direction of the cylindrical member, the heater having a heating region, the heating region being configured to radiate heat when a current is supplied thereto;

a holder holding the heater;

a sensor in contact with the heater, the sensor being configured to detect a temperature of the heater;

a roller in contact with an outer peripheral face of the cylindrical member, the roller forming a nip between the roller and the cylindrical member; and a pressing mechanism configured to change a pressure between the cylindrical member and the roller, wherein the pressing mechanism is configured to change the pressure so as to switch a state between the cylindrical member and the roller, the state is switched to a first state, a second state, or a third state, in the first state, the cylindrical member and the roller form the nip, in the second state, the cylindrical member and the roller come into contact with each other, and a force applied between the cylindrical member and the roller is smaller than that in the first state, and in the third state, the holder supports the heater such that the roller is separated from the cylindrical member and a gap is formed between the heater and the holder in a region overlapping the heating region in the axial direction, the heater is bent in an arc shape when seen in a direction in which a sheet is carried by the cylindrical member and the roller, the cylindrical member has a contact portion, the contact portion is configured to come into contact with a center of the heater in the axial direction in a state in which the cylindrical member is separated from the roller, the cylindrical member is pushed to the center of the heater in the axial direction to form a gap between the heater and the cylindrical member in the state in which the cylindrical member is separated from the roller, and the gap between the heater and the cylindrical member increases outward in the axial direction from the contact portion.

* * * * *